United States Patent [19]

Corbin et al.

[11] Patent Number: 4,607,021
[45] Date of Patent: Aug. 19, 1986

[54] ACTIVATION OF FLY ASH

[75] Inventors: David R. Corbin, New Castle, Del.;
Louis J. Velenyi, Lyndhurst, Ohio;
Marc A. Pepera, Northfield, Ohio;
Serge R. Dolhyj, Parma, Ohio

[73] Assignee: The Standard Oil Company, Cleveland, Ohio

[21] Appl. No.: 336,546

[22] Filed: Jan. 4, 1982

[51] Int. Cl.$^4$ .................. B01J 21/18; B01J 21/12; B01J 23/74; C10K 3/04
[52] U.S. Cl. ..................... 502/185; 44/1 F; 48/197 R; 423/437; 431/2; 502/5; 502/182; 502/183; 502/184; 502/438; 518/720; 518/721
[58] Field of Search .............. 252/447, 445, 455 R, 252/472; 75/25, 26, 0.5 BA; 106/DIG. 1; 502/5, 185, 222, 183, 184, 182, 438, 258

[56] References Cited

U.S. PATENT DOCUMENTS

| | | | |
|---|---|---|---|
| 1,789,507 | 1/1931 | Aarts | 252/447 |
| 2,438,584 | 3/1948 | Stewart | 252/472 |
| 2,683,726 | 7/1954 | McGrath et al. | 252/455 |
| 3,328,180 | 6/1967 | Ban | 106/41 |
| 3,965,045 | 6/1976 | Leach | 252/466 J |
| 4,043,831 | 8/1977 | Friedman | 106/288 B |
| 4,121,945 | 10/1978 | Hurst et al. | 106/DIG. 1 |
| 4,207,208 | 6/1980 | Lucki et al. | 252/419 |
| 4,242,103 | 12/1980 | Rabo et al. | 48/197 R |
| 4,242,104 | 12/1980 | Frost et al. | 48/197 R |
| 4,242,105 | 12/1980 | Frost | 48/197 R |
| 4,252,777 | 2/1981 | McDowell et al. | 423/111 |
| 4,319,988 | 3/1982 | Aldrich | 106/DIG. 1 |

FOREIGN PATENT DOCUMENTS 2002726A 2/1979 United Kingdom .

Primary Examiner—P. E. Konopka
Attorney, Agent, or Firm—Salvatore P. Pace; David J. Untener; Larry W. Evans

[57] ABSTRACT

Fly ash is activated by heating a screened magnetic fraction of the ash in a steam atmosphere and then reducing, oxidizing and again reducing the hydrothermally treated fraction. The activated fly ash can be used as a carbon monoxide disproportionating catalyst useful in the production of hydrogen and methane.

3 Claims, No Drawings

ACTIVATION OF FLY ASH

The Government of the United States of America has rights in this invention pursuant to cooperative agreement Number DE-FC 21-80 MC 14400 awarded by the U.S. Department of Energy.

BACKGROUND OF THE INVENTION

1. Field of the Invention

The present invention relates to a novel process for the activation and utilization of fly ash. More particularly, the present invention relates to a process for activating coal fly ash and its subsequent use for the production of electricity and/or in the production of methane, hydrogen and carbon oxides.

2. Description of Art

Fly ash, a waste material produced upon the combustion of powdered coal, has found limited use. U.S. Pat. No. 4,043,831 to Friedman discloses the use of densified fly ash as a heat exchange material for a fluidized bed carbon gasification zone. U.S. Pat. No. 3,328,180 to Bann discloses a type of aggregated coal ash known as "light weight aggregate" useful in concrete mixes and cinder blocks. U.S. Pat. No. 4,252,777 to McDowell et al. discloses a process for the recovery of aluminum and other metals from fly ash.

U.K. patent application GB No. 2 002 726A describes processes for making high BTU gas containing methane and byproduct electricity from low BTU gas containing carbon monoxide and optionally some hydrogen. Generally, the processes are accomplished by contacting the low BTU gas with iron or other Group VIII metals causing disproportionation of the carbon monoxide to carbon dioxide and elemental carbon. The elemental carbon deposits on the Group VIII metal to form a carbonaceous material and carbon monoxide-depleted low BTU gas which is used to generate electricity. The carbonaceous material is contacted with hydrogen to produce a high BTU gas containing methane.

It has been found that fly ash can be activated by the process of the present invention. Once activated, fly ash can disproportionate carbon monoxide to carbon dioxide and elemental carbon. This is especially surprising since unactivated fly ash does not disproportionate carbon monoxide.

Upon disproportionation, elemental carbon deposits on the activated fly ash forming a highly carbonaceous ash. The carbonaceous ash can be burned as a fuel either directly or in combination with other combustible fuels to produce heat and electricity. The carbonaceous ash can alternatively be used for the production of methane, hydrogen and carbon oxides.

The present invention is economically attractive for several reasons. For example, the present invention provides for an inexpensive catalyst source for a number of catalytic processes as well as providing an economical and efficient use for a common waste product. Further, the source of catalytic material is so inexpensive that the catalysts prepared by the processes of the present invention can be employed only for its "active" life and disposed of without regeneration. However, although the catalyst can be disposed of after one or several cycles, it can be recycled simply by utilizing the process of the present invention.

SUMMARY OF THE INVENTION

The present invention provides a process for activating fly ash comprising:
(a) sizing the fly ash to produce a sized fraction;
(b) hydrothermally treating the fraction;
(c) reducing the fraction of step (b);
(d) oxidizing the fraction of step (c); and
(e) reducing the fraction of step (d).

The present invention further provides the activated fly ash so made.

In an alternative embodiment of the invention, carbonaceous ash and a process for preparing carbonaceous ash is provided, the process comprising contacting activated fly ash with carbon monoxide under carbon monoxide disproportionating conditions.

In another embodiment of the invention, methane is produced by a process comprising contacting carbonaceous ash with hydrogen at temperatures of at least 300° C. and pressures of at least about 1 atmosphere.

In another embodiment of the invention, a gas mixture containing hydrogen and other light hydrocarbons such as methane are produced by a process comprising contacting carbonaceous ash with steam at temperatures of at least 400° C. and pressures of at least about 1 atmosphere.

In a further embodiment of the invention, carbonaceous ash is burned as a fuel to produce heat.

DETAILED DESCRIPTION OF THE INVENTION

The term "fly ash" as used herein is the fine air entrained inorganic ash residue produced upon combustion of organic material such as powdered coal in a fluidized bed power plant boiler. Depending upon the organic material source, the chemical composition of fly ash typically falls within the following ranges:

| Element | Percent |
|---|---|
| Carbon (residual) | 0.1–16.0 |
| Silica | 30.0–60.0 |
| Alumina | 15.0–30.0 |
| Iron Oxides | 5.0–20.0 |
| Sulfur | 0.0–3.0 |
| Other Oxides | 3.0–9.0 |

Fly ash has long been considered a waste material and is therefore commercially available at low cost from various power companies which burn organic material such as pulverized coal. Approximately fifty million tons of fly ash are produced annually, with only a small portion finding use.

Fly Ash Activation

Fly ash is activated by a multi-step procedure. Initially, the fly ash is uniformly sized by various techniques known in the art. Typically, the fly ash is sized through a mesh screen having at least a U.S. standard size of 70 (0.210 mm). Preferaby, the fly ash is screened through a U.S. standard 100 mesh screen (0.149 mm).

The sized fly ash is magnetically separated into a magnetic fraction and a non-magnetic fraction. The magnetic separation is generally employed to increase the magnetic component content of the fly ash. However, should the source fly ash have a high magnetic component content, such as greater than about 25% by weight, the separation may be unnecessary for activation. Magnetic separation is preferred even when the magnetic component content is greater than about 25% by weight. The magnetic separation can be accomplished by various techniques such as passing the sized fly ash through electrically induced magnetic fields or simply by contacting the sized fly ash with a magnet. The magnetic fraction is then recovered for continued processing.

The magnetic fraction is heated in the presence of a steam atmosphere. The temperature, pressure and length of the hydrothermal treatment can vary widely. Typically, the temperature ranges from about 100° to about 300° C., preferably from about 150° to about 250° C. Subatmospheric, atmospheric or superatmospheric pressure can be used, but typically the pressure ranges from about 100 to about 500 psig, preferably from about 150 to about 450 psig. The length of heat treatment may vary and is typically from about 30 minutes to about 3 hours, depending in part upon the amount of material to be treated.

The hydrothermally treated fraction is reduced, oxidized and again reduced. The reduction and oxidation steps can be performed by any of the various methods known in the art. Typically, the hydrothermally treated fraction is subjected to thermal treatments to effectuate reduction and oxidation. Reduction is generally performed by subjecting the fly ash to a temperature of at least 400° C. for at least 1 hour and then the temperature is increased to at least 600° C. for approximately 30 minutes. Generally, reduction is performed in a reducing atmosphere, such as in the presence of hydrogen, at atmospheric pressures. Oxidation is typically performed at a temperature of at least 250° C. for about 2 hours in an oxidizing atmosphere, such as in the presence of molecular oxygen, carbon dioxide or air at atmospheric pressures. The final reduction is performed as described above for the initial reduction.

Activated Fly Ash Utilization

Once fly ash is properly activated as described above, it can be used to disproportionate carbon monoxide to carbon dioxide and elemental carbon with carbon depositing on the activated fly ash producing a carbonaceous ash. The carbonaceous ash can be burned to produce heat for the production of electricity or can be utilized in the production of methane, hydrogen and carbon oxides.

Processes for disproportionating carbon monoxide to carbon dioxide and elemental carbon are well known in the art. Generally, the processes are accomplished by contacting a carbon monoxide-containing gas with a disproportionating catalyst such as iron or other Group VIII metals causing disproportionation of the carbon monoxide. The elemental carbon deposits on the metal catalyst to form a carbonaceous material and a carbon monoxide-depleted low BTU gas which can be used to generate electricity.

Surprisingly, it has been found that activated fly ash can disproportionate carbon monoxide. When fly ash was not activated according to the process of the present invention and was contacted with carbon monoxide under disproportionating conditions, essentially no catalytic activity was observed. However, treating the fly ash according to the process of the present invention activates the fly ash resulting in a highly active and stable disproportionating catalytic material.

Generally, to disproportionate carbon monoxide, a carbon monoxide-containing gas, preferably containing at least 10% by volume carbon monoxide, is contacted with the activated fly ash. The carbon monoxide is disproportionated to carbon dioxide and elemental carbon with the elemental carbon depositing on the fly ash to form a carbonaceous ash material. The minimum temperature at which disproportionation is conducted is about 350° C. with a preferred range from about 500° C. to about 600° C. The pressure can be subatmospheric, atmospheric or superatmospheric and typically ranges from about 1 to 100 atmospheres and preferably 1 to about 10 atmospheres.

In one embodiment of the invention, the carbonaceous ash is contacted with hydrogen at temperatures of at least 300° C. and pressures of at least about 1 atmosphere to produce methane. The temperature at which methanation is preferably conducted ranges from about 300° C. to about 700° C. The pressure ranges preferably from about 1 to about 100 atmospheres. A typical methanation process is more fully described in GB No. 2 002 726A.

In an alternate embodiment of the present invention, the carbonaceous ash is contacted with steam to produce a product gas mixture containing hydrogen, methane and carbon oxides. The carbonaceous ash is highly reactive with steam at pressures of at least about 1 atmosphere and preferably in the range of about 1 to about 100 atmospheres and at temperatures of at least 400° C. and preferably in the range of about 400° C. to about 800° C. Most preferably, the pressure will range from about 1 to about 10 atmospheres and the temperatures will range from about 500° C. to about 750° C. Typically, the molar ratio of steam to carbon gasified range from about 0.1 to about 10.0, preferably from about 0.5 to about 3. Although pure steam is preferred, diluent gases can be used in combination with steam. The diluent gases may include any inert gases such as nitrogen, helium, argon, krypton and the like.

In another embodiment of the present invention, the carbonaceous ash can be used directly as a fuel source or can be mixed with coal, oil or other combustible fuels and burned for heat generation. The carbonaceous ash can be combined with the combustible fuel in any ratio or combination, the preferred combination dependent only upon the particular use. The generated heat can be ultimately used for the production of electricity.

SPECIFIC EMBODIMENTS

The composition of the fly ash used herein and the compositions of the fly ash at different stages during the activation process of the present invention can be found in Table I.

ACTIVATION

Example 1

Fly ash was sized through a 100 mesh (U.S. standard) screen (0.149 mm). The screened fraction was contacted with a magnet and the magnetic fraction was removed. The magnetic fraction (53.6 g) was then heated to a temperature of 175° C. for 3 hours at 200 psig (14.1 Kg/cm$^2$) in the presence of 183.7 gms of water. The hydrothermally treated fraction was subsequently reduced in a hydrogen atmosphere at atmospheric pressure for 90 minutes at 550° C., then 30 minutes at 650° C. The reduced fraction was subsequently oxidized in an air atmosphere at atmospheric pressure for 3 hours at 450° C. The oxidized fraction was again reduced in a hydrogen atmosphere at atmospheric pressure for 1 hour at 550° C., then 30 minutes at 725° C.

TABLE I

| Component | Concentration in Weight % | | |
|---|---|---|---|
| | Untreated | Magnetic Fraction | Magnetic Fraction Hydrothermally Treated |
| Aluminum | 9.8 | 7.2 | 6.9 |
| Arsenic | 0.0720 | 0.0560 | 0.0520 |
| Barium | 0.0300 | 0.0220 | 0.0210 |
| Beryllium | 0.0045 | 0.0040 | 0.0040 |
| Calcium | 1.4 | 1.3 | 1.1 |
| Cadmium | 0.0020 | 0.0200 | 0.0090 |
| Cobalt | 0.0060 | 0.0060 | 0.0060 |
| Chromium | 0.0170 | 0.0080 | 0.0090 |
| Copper | 0.0160 | 0.0120 | 0.0130 |
| Iron | 29.0 | 45.0% | 41.0 |
| Potassium | 0.9200 | — | — |
| Magnesium | 0.1600 | 0.2400 | 0.2200 |
| Manganese | 0.0280 | — | — |
| Molybdenum | 0.0050 | 0.0060 | 0.0050 |
| Sodium | 0.3000 | 0.1000 | 0.0610 |
| Nickel | 0.0260 | 0.0200 | 0.0200 |
| Phosphorus | 0.0380 | 0.0700 | 0.0600 |
| Lead | 0.0050 | — | — |
| Selenium | 0.1000 | 0.0500 | 0.0500 |
| Silicon | 13.0 | 8.9 | 8.4 |
| Titanium | 0.5700 | 0.4 | 0.0039 |
| Vanadium | 0.0270 | 0.0260 | 0.0280 |
| Zinc | 0.0270 | 0.0110 | 0.0100 |

DISPROPORTIONATION OF CARBON MONOXIDE

Example 2

Activated fly ash (35.20 g), prepared according to the procedure of Example 1, was contacted with a reactant gas containing about 14% (by volume) hydrogen, 28% nitrogen and 48% carbon monoxide in a 25 mm (internal diameter) quartz fluid-bed reactor at flow rates of 46 cc/min, 92 cc/min and 193 cc/min, respectively. At 550° C. and atmospheric pressure, elemental carbon was deposited on the activated fly ash at an average rate of 0.85 grams/hour.

Example 3

The carbonaceous ash (36.26 g) as prepared in Example 2 was contacted with hydrogen in a 20 cc quartz reactor at a flow rate of 129 cc/min. At 550° C. under atmospheric pressure, elemental carbon was depleted from the carbonaceous ash at a rate of 1.27 grams/hour and converted to product gas containing about 11% methane.

Example 4

In another embodiment of the invention, 27.73 gms of carbonaceous ash as prepared in Example 2 was contacted with steam at a flow rate of 145 cc/min and a nitrogen diluent gas at a flow rate of 92 cc/min at 650° C. and atmospheric pressure. After 1 hour, 1.86 grams of carbon was depleted from the carbonaceous ash and converted to a product gas containing about 42% (molar %) hydrogen, 8% carbon dioxide, 33% nitrogen, 1% methane and 18% carbon monoxide.

Comparative Examples

Table II illustrates the necessity of using the specific multi-step process of the present invention to activate fly ash for the disproportionation of carbon monoxide. Examples A through D were each subjected to a varying number of steps, each less than the total number of steps in the process of the present invention. Each individual process step was performed as described above.

No activity (i.e., no disproportionation of carbon monoxide) was observed when the fly ash was contacted with carbon monoxide after the following was performed: screening and reduction (Example A); screening, separating the magnetic fraction and reduction (Example B); screening, separating the magnetic fraction, hydrothermal treatment and reduction (Example C); and screening and reduction/oxidation/reduction (Example D).

Examples 5 and 6 illustrate that when the process of the present invention is employed following the procedure of Examples 1 and 2, elemental carbon is deposited on the activated fly ash at the repeatedly high rates of 2.04 grams C/hr and 2.27 grams C/hr, respectively.

TABLE II

| Example | Treatment | Deposition of Carbon |
|---|---|---|
| A | Screening, Reduction | None |
| B | Screening, Magnetic Separation, Reduction | None |
| C | Screening, Magnetic Separation, Hydrothermal Treatment, Reduction | None |
| D | Screening, Reduction/Oxidation/Reduction | None |
| 5 | Screening, Magnetic Separation Hydrothermal Treatment, Reduction/Oxidation/Reduction | 2.04 g C/hr |
| 6 | Screening, Magnetic Separation Hydrothermal Treatment, Reduction/Oxidation/Reduction | 2.27 g C/hr |

Thus, it should be apparent to those skilled in the art that the subject invention accomplishes the objects set forth above. It is to be understood that the subject invention is not to be limited by the examples set forth herein. These have been provided merely to demonstrate operability and the selection of fly ash sources, reactant gases and reaction conditions can be determined from the total specification disclosure provided without departing from the spirit of the invention herein disclosed and described. The scope of the invention includes equivalent embodiments, modifications and variations that fall within the scope of the attached claims.

What is claimed is:

1. A process for activating fly ash comprising:
   (a) sizing the fly ash to produce a sized fraction and separating therefrom a magnetic fly ash fraction;
   (b) hydrothermally treating the sized-magnetic fraction;
   (c) reducing the fraction of step (b);
   (d) oxiding the fraction of step (c); and
   (e) reducing the fraction of step (d) to thereby form activated carbon monoxide disproportionation fly ash catalyst.

2. The process of claim 1 wherein the hydrothermal treatment is performed at temperatures from about 100° C. to about 300° C. and pressures from about 100 psig to about 500 psig.

3. Activated fly ash prepared by the process comprising:
   (a) sizing the fly ash to produce a sized fraction and separating therefrom a magnetic fly ash fraction;
   (b) hydrothermally treating the sized-magnetic fraction;
   (c) reducing the fraction of step (b);
   (d) oxidizing the fraction of step (c);
   (e) reducing the fraction of step (d) and recovering activated carbon monoxide disproportionation fly ash catalyst.

* * * * *